United States Patent [19]
Zachariadis

[11] 4,404,664
[45] Sep. 13, 1983

[54] SYSTEM FOR LATERALLY POSITIONING A TOWED MARINE CABLE AND METHOD OF USING SAME

[75] Inventor: Robert G. Zachariadis, Dallas, Tex.

[73] Assignee: Mobil Oil Corporation, New York, N.Y.

[21] Appl. No.: 221,733

[22] Filed: Dec. 31, 1980

[51] Int. Cl.³ .............................. G01V 1/38
[52] U.S. Cl. ........................ 367/19; 367/17; 114/246
[58] Field of Search ............ 367/16, 17, 19, 106; 114/242, 246

[56] References Cited

U.S. PATENT DOCUMENTS

| | | | |
|---|---|---|---|
| 3,581,273 | 5/1971 | Hedberg | 367/19 |
| 3,605,674 | 9/1971 | Weese | 114/235 B |
| 3,953,827 | 4/1976 | LeMoal et al. | 340/7 R |
| 4,033,278 | 7/1977 | Waters | 114/245 |
| 4,066,993 | 1/1978 | Savit | 367/77 |
| 4,068,208 | 1/1978 | Rice, Jr. et al. | 340/7 R |
| 4,086,504 | 4/1978 | Ezell et al. | 367/77 |
| 4,087,780 | 5/1978 | Itria et al. | 367/17 |
| 4,152,691 | 5/1979 | Ward | 367/77 |
| 4,231,111 | 10/1980 | Neeley | 367/19 |
| 4,323,989 | 4/1982 | Huckabee et al. | 367/17 |

FOREIGN PATENT DOCUMENTS

| | | | |
|---|---|---|---|
| 10660 | 5/1980 | European Pat. Off. | 367/77 |
| 18053 | 10/1980 | European Pat. Off. | 367/17 |

OTHER PUBLICATIONS

U.S. Patent Application 885,916, Inventor Walter P. Neeley, filed Mar. 13, 1978.
Syntron, Inc., Remote-Controlled "Cable Leveler," brochure.

*Primary Examiner*—Nelson Moskowitz
*Attorney, Agent, or Firm*—Alexander J. McKillop; James F. Powers, Jr.; George W. Hager, Jr.

[57] ABSTRACT

A marine cable positioning system which includes a plurality of magnetic compasses and a plurality of lateral positioning devices spaced at known intervals along the cable being towed by a marine vessel. Readings from the compasses together with readings from a magnetic compass and gyrocompass onboard the towing vessel are gathered and used with a selected reference heading to generate X-Y coordinates of the lateral positioning devices with respect to the towing vessel and selected reference heading. These coordinates are recorded and provided to a cathode ray tube for visual display of the relative position of each lateral positioning device with respect to the vessel and selected heading. Coded digital commands are generated and transmitted to each lateral positioning device for adjustment of its control surfaces whereby the lateral thrust produced the device as it is towed through the water is varied and the horizontal position of the portion of the cable to either side of the device controlled. Feedback of changes in the cable's location are provided by updated compass readings and visual displays. Each lateral positioning device responds to a command for a specific adjustment of its control surfaces or for the return of the control surfaces to a neutral orientation where lateral thrust is not produced.

1 Claim, 8 Drawing Figures

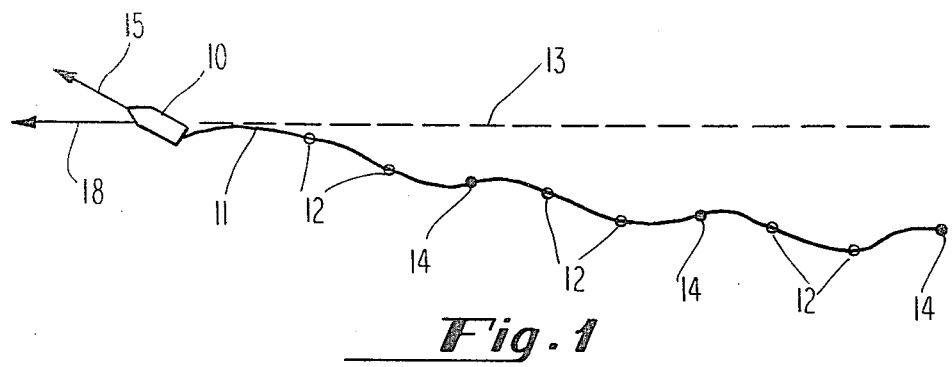
Fig. 1
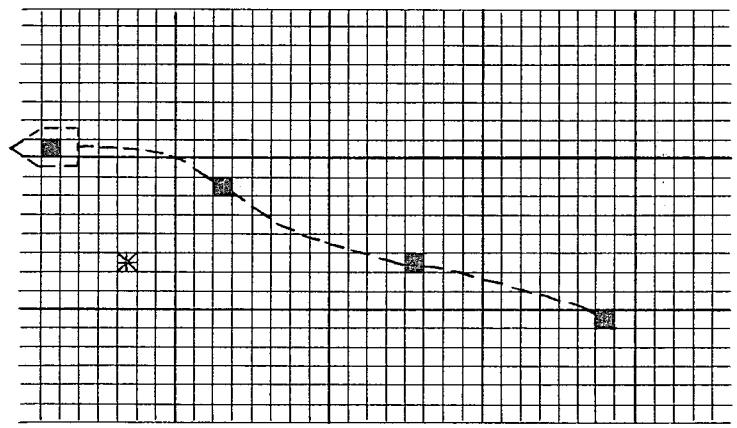
Fig. 4
Fig. 5

SYSTEM FOR LATERALLY POSITIONING A TOWED MARINE CABLE AND METHOD OF USING SAME

BACKGROUND OF THE INVENTION

The invention relates to towed marine cable control practice and more particularly but without limitation to the positioning of a towed seismic cable in a desired horizontal orientation by remote control.

Marine seismic exploration is often conducted by means of a marine cable containing a multiplicity of seismic sensors and known in the art as a streamer which is towed beneath the surface of the water by a vessel over an area to be seismic surveyed. Generally such surveys are conducted by towing the streamer along a predetermined line or track over the seafloor creating seismic disturbances in the water along that track by suitable means, and recording signals produced by the seismic sensors as a result. Cross-currents tend to drive the cable laterally off the track, a condition which degrades the quality of the seismic data collected. Thus it is desirable to be able to tow a seismic cable in a straight line along a selected heading despite the presence of cross-currents and the like which tend to drive segments or the entire cable laterally from the selected track.

Obstacles are sometimes encountered which force the towing vessel to break away from the track so as to avoid damaging the towed cable. As these cables are often two miles or more in length, a time consuming detour must be made to avoid the obstacle and to reposition the cable along the track. It is therefore also desirable to be able to controllably move selected sections of a marine cable laterally to the direction in which the cable being towed so as to, for example, steer the cable around the obstacles and to reposition the cable along track on the far side of the obstacle while avoiding a lengthy detour.

Lateral positioning of a towed cable comprises two basic aspects: determining the existing position of the cable and moving it to a desired position. Examining the latter aspect first, designs for remotely controllable lateral positioning devices for use with seismic and other towed marine cables are disclosed in U.S. Pat. Nos. 3,605,674 to Weese and 4,330,278 to Waters. Weese discloses several variations of a remotely controlled device for laterally or laterally and vertically positioning a streamer or other towed marine cable. Each device is mounted around the cable and, depending upon the embodiment, is provided with pairs of vertical or vertical and horizontal fins rotatable for directional control. Waters discloses a different embodiment of a depth and lateral positioning apparatus comprising vertically oriented hydrofoil supported from the sea surface by a float and in turn supporting a length of the towed cable by resilient connecting means. In Weese, an undefined signal is generated and transmitted in an undescribed fashion along wires within the cable being towed to appropriate sensing and actuating equipment within each lateral positioning device which accomplishes the rotation of the fins. Waters further discloses a control method and acoustic apparatus for automatically positioning a multiplicity of the lateral positioning devices along a straight line at a selected heading from the towing boat. The control method and apparatus described by Waters is unsuited for selectively positioning individual lateral positioning devices.

Several means for determining and monitoring the location of a towed cable are known. Weese and Waters both suggest locating and monitoring the position of the towed cable by means of sonar transponders positioned at selected points along the cable. The transponders can be used in a variety of ways with complementary equipment in the towing vessel to provide data from which the range and heading of each transponder with respect to the towing vessel can be calculated. Weese alternately suggests monitoring the location of the cable by horizontal ranging sonar, presumably on the towing vessel.

An entirely different method of locating a streamer or other marine cable with respect to a towing vessel is described in U.S. Pat. No. 3,953,827 to Le Moal et al. Le Moal et al discloses determining the locus of a towed cable by identifying the angles of tangents to the cable with respect to a fixed and known direction, such as magnetic north, at a plurality of known measuring points along the cable. The angular information is supplied by a suitable sensor located at each measuring point, preferably a magnetic compass. Means are also provided for coding and transmitting the measured angular values by means of electronic pulses to a central station. The position of each measuring point is determined by approximating that part of the towed cable located between the sensors to a circular arc, the length of which is known from the spacing of the sensors, while the angular value of the arc is determined from the differences between the angles formed by the tangent to the cable at the measuring points and the fixed and known direction. The positions of other known points along the cable are then determined by interpolation. Compared with the transducer locating methods described by Weese and Waters, the Le Moal et al method allows the more accurate determination of inflections in the cable between the measuring points. This information is of particular importance in seismic surveying where the precise location of the streamer sensors providing the seismic data is desired for correction purposes. The Le Moal et al method does not suffer from loss of sight of the cable which may be encountered by horizontal ranging sonar when the distal end of the towed cable is shielded under certain orientations by deflections of the cable lying in the line of sight of the sonar. Furthermore, the horizontal ranging sonar cable monitoring method does not identify the location of the lateral positioning devices along the cable nor does it provide cable positioning information in a form convenient for seismic data correcting. U.S. Pat. No. 4,068,208 to Rice, Jr. et al discloses yet another marine streamer position determining system which, however, is unsuited for cable monitoring use with lateral positioning devices.

U.S. patent application Ser. No. 885,916 filed Mar. 13, 1978, by Walter P. Neeley, which has been assigned to the assignee of this invention, discloses a marine seismic cable location system which utilizes cable tangent headings to determine the relative horizontal position of a cable with respect to a towing vessel and to produce a visual display of the towing vessel and cable for monitoring purposes.

SUMMARY OF THE INVENTION

It is an object of th invention to provide a system for controlling the lateral position of a cable being towed through the water.

It is another object of the invention to provide a system for controlling a plurality of lateral positioning devices secured to a seismic cable at selected points utilizing cable monitoring means which permit the estimation of the location of seismic sensors also spaced along the cable.

It is yet another object of the invention to estimate the location of selected points along the cable by monitoring the headings of tangents to the cable at known points along its length.

Accordingly, a plurality of remotely controlled, lateral positioning devices are mounted at selected points along the length of a cable being towed. Pluralities of positioning sensors, such as magnetic compasses, are located at other selected points between the towing vessel and first lateral positioning device and between adjacent lateral positioning devices for providing signals representing the heading of tangents to the cable at the location of the position sensors. The position sensor generated signals are used by a computer to produce signals representing the horizontal position coordinates of the vessel and of the lateral positioning devices relative to the vessel and to a selected heading, such as the course made good heading of the vessel. The coordinate signals are provided to a display matrix of a suitable device such as a cathode ray tube for display of the relative positions of the vessel and lateral positioning devices with respect to the selected heading. Where magnetic compasses are used along the cable, other means such as a magnetic compass and gyrocompass are provided on-board the vessel for determining corrections to allow for the local magnetic compass variations.

It is a further object of the invention to provide operative means for controlling selected lateral positioning devices whereby the location of segments of the cable between such selected devices may be individually controlled.

It is a further object to control the lateral positioning devices of such a system through the use of a computer.

Accordingly, means such as the aforesaid computer are provided for generating a coded signal representing the identification of the lateral positioning device selected for control and information for the activation and operation of the motor means within the selected lateral positioning device for accomplishing a desired control surface adjustment. The aforesaid control signal is generated in response to a signal provided by operator means, such as a keyboard, or in direct response to the aforesaid vessel and lateral positioning device coordinate signals. Transmission means are provided for converting the coded control signal into a form suitable for transmitting through conductors in the seismic cable. Suitable circuitry in each lateral positioning device senses and examines the coded control signal to determine if the signal was directed to that device. In the selected lateral positioning device, circuitry further decodes the coded control signal. Motor actuation means are controlled by the decoder means in accordance with the information provided in the coded control word and operate motor means for the adjustment of the lateral positioning control surfaces in the designated direction and to the desired degree. Feedback is provided by updated vessel and lateral positioning device coordinate signals. Additional control signals may be generated in the previously described manner to further position the device or to commence the relocation of another lateral positioning device.

In a further aspect of the invention, coordinates of obstacles in the path of the towing vessel and/or cable are identified with respect to the vessel's position and entered into the computer by suitable means such as an operator keyboard for entry into the matrix of the visual display for presentation with the aforesaid coordinates of the vessel and lateral positioning devices.

In yet another aspect of the invention each lateral positioning device is provided with means for automatically returning its vertical control surfaces to a neutral orientation upon operator command.

BRIEF DESCRIPTION OF THE DRAWINGS

FIG. 1 illustrates a seismic exploration system utilizing the invention;

FIG. 4 represents a truth table for locating the bearing of a lateral positioning device;

FIG. 5 illustrates a visual display of the coordinates of the vessel and selected points along the towed cable as determined by the equipment of FIG. 2;

DESCRIPTION OF THE PREFERRED EMBODIMENT

Figure 2:
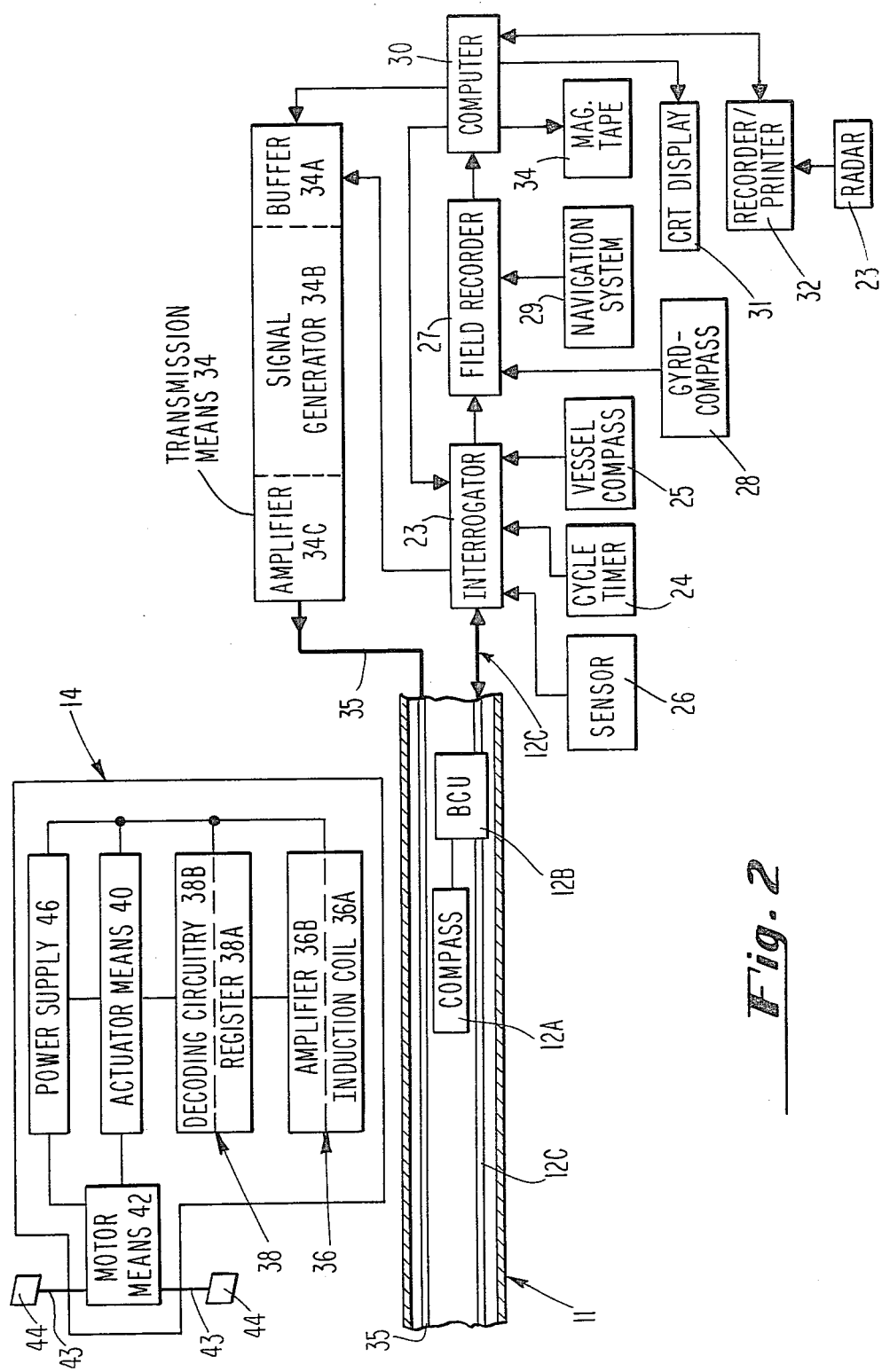
FIG. 2 illustrates in block diagram form the cable monitoring and positioning equipment of the invention employed with the exploration system of FIG. 1.

In seismic marine exploration, a surface vessel 10 of FIG. 10 tows a seismic detector cable or streamer 11 along a selected line of exploration or track 13. The heading 15 of the vessel 10 is varied depending upon the absence or presence of cross-currents so that the vessel 10 follows a net or "course made good" heading 18 along the track 13. The cable 11 conventionally employs a plurality of hydrophones or other suitable seismic wave detectors (not shown) spaced along its length for receiving seismic wave reflections from geophysical strata beneath the seafloor. One or more seismic wave sources (not depicted), such as airguns, are also typically towed by the vessel 10 to generate seismic waves, the reflections of which are received by the hydrophones. Conductors running through the streamer 11 carry seismic sensor generated signals back to the vessel for recording, retransmission and/or display.

Positioned at known distances along the cable 11 are a plurality of cable tangent heading sensors 12, six of which are illustrated in FIG. 1, and a plurality of lateral positioning devices 14, three of which are illustrated in FIG. 1. Each sensor 12 provides a signal representing the magnetic heading of the tangent to the cable in the horizontal plane at that particular point. By knowing the headings of tangents to the cable at a plurality of points along its length and the distances between each of such points, the location of the cable can be determined in a manner subsequently described. Each lateral positioning device 14 is provided with a plurality of vertical control surfaces which can be adjusted by remote control as will also be later described so as to vary the magnitude of the lateral component of force to which each device is subjected at any given time as it is towed through the water.

FIG. 2 depicts in schematic, block diagram form, a preferred embodiment of the invention. Each sensor 12, one of which is depicted, includes a magnetic compass 12A such as a Model 319 Magnetic Sensor supplied by Digicourse, Inc., and a binary control unit 12B, such as a Model 350 Binary Control Unit also by Digicourse, Inc. The readings of the compasses 12A are multiplexed by the associated binary control units 12B on to a single pair of wires 12C running the length of the cable to the on-board cable location computing system. Each binary control unit 12B is addressed with its appropriate code number by an interrogator 23, a Model 290 Data Acquisition Unit of Digicourse, Inc. or similar functioning device. A start pulse from either a computer 30 or a cycle timer 24 initiates the multiplexing of the magnetic compass headings from the control units 12B to information registers in the interrogator 23. Also applied to an information register in the interrogator 23 is the heading from an on-board magnetic compass 25, such as the Model 101 Magnetic Sensor of Digicourse, Inc. The compass heading in any one of the information registers can be visually displayed on a suitable sensor display 26 such as a Model 102 Sensor Display of Digicourse, Inc. or a similarly functioning device.

The information registers of the interrogator 23 transfer the compass headings to an external header unit in a field recorder 27, such as a DFS V Digital Field Recorder of Texas Instruments, Inc. or other comparable seismic recording system. Also applied to such external header unit is the heading of the vessel with respect to true north from an on-board gyrocompass 28 and the absolute coordinates of the vessel in a geodetically fixed coordinate system from an on-board navigation system 29. The field recorder 27 therefore contains all the information required to compute the absolute positions of the vessel and cable and the position of the cable relative to the vessel. The compass headings and absolute coordinates of the vessel are outputted from the field recorder 20 to a digital computer 30 which may be dedicated to cable location/control or a general purpose device used in connection with other exploration activities. A recorder/printer 32 having a keyboard, such as a Texas Instruments, Inc. Silent 730 KSR, is provided for operator entry of a selected heading to the computer 30. The computer 30 uses the aforesaid selected heading to determine the coordinates of the lateral positioning devices in a two dimension, cartesian (X and Y) coordinate system centered on the vessel and oriented with respect to the selected heading. The X and Y coordinates together with the absolute coordinates of the vessel and the various compass headings are outputted to a suitable device such as a magnetic tape unit 24 for recording and later use. A simple plot of the X and Y coordinates of the ship and the lateral positioning devices is provided on a suitable visual display device such as a cathode ray tube 31. The computer 30 also provides the bearing and range of each lateral positioning device 14 with respect to the slip and selected heading, on the keyboard recorder/printer 32. When the course made good heading of the vessel is selected by the operator, as is suggested when towing a seismic cable along a track, and entered into the computer 30 through the keyboard 32, the compass bearings to the positioning devices will be generally reciprocal to the course made good heading. The displacement of each lateral positioning device 14 from the selected track is visible on the display unit 31.

Control commands for a selected lateral positioning device 14 are entered by a cable positioning operator through the recorder/printer 32 for inputting to the computer 30. The computer 30 is programmed to respond to the operator entered control command to generate an appropriately coded digital command word which is outputted from the computer 30 is a suitable transmission means 34 for subsequent transmission along wires 35 in the cable 11 to the lateral positioning devices 14, one of which is depicted functionally. Alternatively, the computer can be programmed to respond directly to the coordinate information to automatically generate suitable lateral positioning device control signals.

A suitable receiver means 36 in each lateral positioning device 14 detects and reconstitites the digital word and passes it to the decoder means 38 which examines the coded control word to determine if it is directed to that device 14. If found to apply to that device 14, the decoder means 38 provides in response to the coded word an appropriate signal to actuator means 40 within the device 14 which in turn provides power to a motor 42 to adjust a plurality of vertical control surfaces 44 in the desired direction and to the desired extent. Changes in the location of the selected lateral positioning device 14 with respect to the vessel will be disclosed through subsequent readings of the magnetic compasses 12A and generation of new coordinates. In response to the new position, corrective commands may be made by the operator through the recorder/printer 32 or automatically by the computer for final positioning of each device 14.

Having generally described the invention in conjunction with the block schematic of FIG. 2, a more detailed description of the operation of the various units of FIG. 2 will now be described in conjunction with the location and lateral positioning of the cable 11 during a towing operation.

During seismic operations each seismic recording cycle is initiated at time zero by a ground signal from the cycle timer 24. If seismic operations are not being carried out, the computer 30 can supply the ground signal to the interrogator 23. This signal is utilized by the interrogator 23 to successively address each binary control unit 12B for an appropriate length of time (100 milliseconds for the Digicourse unit in this example). The on-board magnetic compass 25 is also read by the interrogator 23 (requiring 60 milliseconds to accomplish with the compass and interrogator previously specified). When the sensor polling operations of the interrogator 23 are complete, it outputs a signal to the transmitter means 32. The magnetic compass readings are then outputted from information registers (not depicted) of the interrogator 23 to the external header unit of the field recorder 27. Also passed to the field recorder 27 are the true north heading of the ship from the gyrocompass 28 and the absolute coordinates of the vessel from the on-board navigation system 29. The compass readings and on-board navigation system coordinates are then read out of the field recorder 27 and into the computer 30. The course made good heading to be followed by the vessel during towing is inputted into the computer 30 by the cable control operator through the keyboard in the recorder/printer 32. The computer 30 has previously been supplied with information regarding the spacing of each of the magnetic compasses 12A and lateral positioning devices 14 along the cable 11. The computer 30 then determines the X and Y coordinates of each lateral positioning device 14 in a cartesian system centered on the vessel with the +X direction being defined as heading off the stern of the vessel at 180° to the aforesaid selected course made good heading and the +Y direction heading off the starboard of the vessel at 90° to the course made good heading. The bearing and range of each lateral positioning device 14 with respect to the ship and the course made good heading are determined by the computer 30 and outputted to the recorder/printer 32 for display.

Determinations of the location of the lateral positioning devices are based upon the theory that between the lateral positioning devices 14, the cable 11 will assume a curve which can be approximated by one or more circular arcs. When tangents to two points along each arc and the distance between the points are known, the location of any point along the arc and chords between any points of the arc can be determined. Thus, chords between the towing vessel and each lateral positioning device can be determined. These chords can then be stacked to depict the cable's position with respect to the course made good heading as the cable is towed through the water. Such stacking will also yield a single vector indicating the distance of the terminus of any chord from the vessel and the bearing of such terminus with respect to the selected (course made good) heading.

Figure 3:
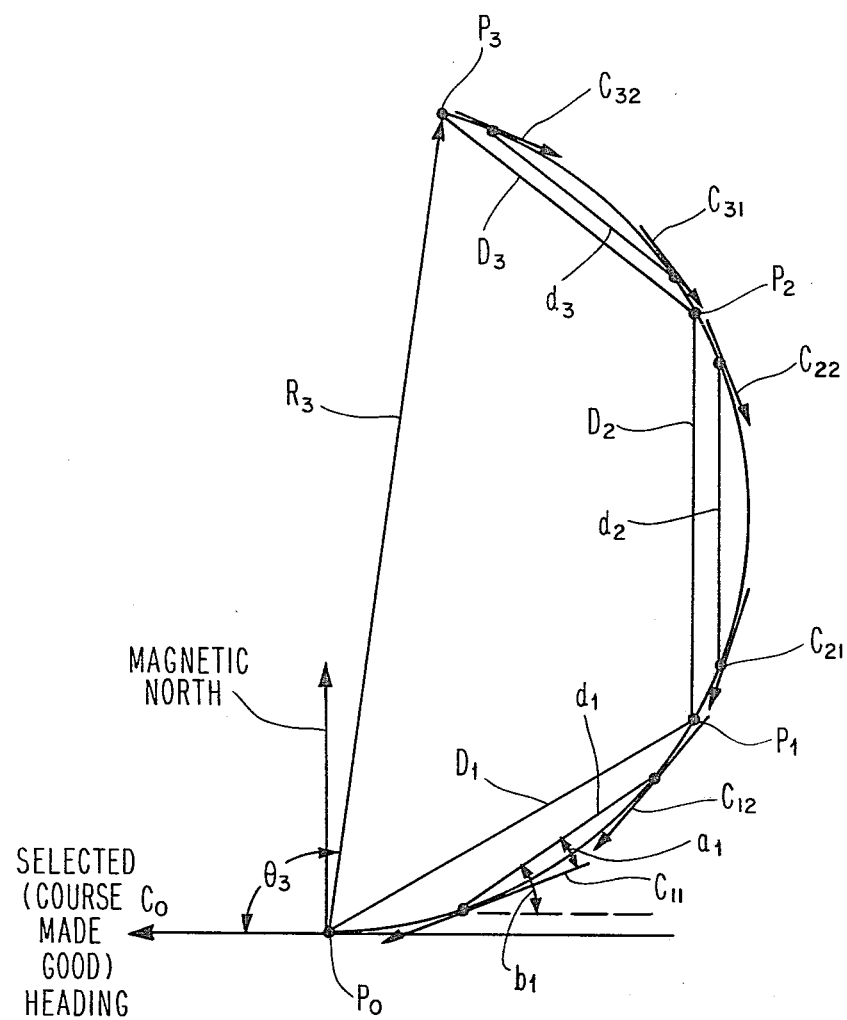
FIG. 3 illustrates the geometric configuration utilized in determining cable lateral positioning device coordinates with respect to the vessel.

Referring more particularly to FIG. 3 there is illustrated an example configuration for a seismic cable 11 being towed by a vessel $P_0$ and mounting three lateral positioning devices $P_1$, $P_2$, $P_3$ and six magnetic compasses $C_{ij}$, $i=1-3$, $j=1-2$. A compass pair ($j=1,2$) is provided along the cable before each lateral positioning device ($P_i$, $i=1-3$). It should be realized that the configuration of the cable depicted in FIG. 3 is exaggerated for purposes of illustration although such a configuration might be achieved during a turning maneuver of the towing vessel. At least two cable tangent headings along a length of cable are required to estimate a circular arc for that cable section. If desired, more than two cable heading sensors can be provided between the vessel and the leading lateral positioning device or between adjoining devices, and circular arcs estimated for each cable segment between such adjoining sensors. Moreover, although it is possible to locate the compasses at any point along the length of arc between the boat and the first lateral positioning device or between adjoining lateral positioning devices, it is suggested for simplification that each compass of a compass pair $C_{ij}$, $j=1,2$, be located an equal distance from the boat or nearest lateral positioning device. Thus, in FIG. 3 the distance along the cable of the first magnetic compass $C_{11}$ from the vessel 10 is equal to the distance between the second compass $C_{12}$ and the first lateral positioning device $P_1$. In this way, each chord between the points $P_{i-1}$ and $P_i$ (such as chord $D_1$ between the vessel $P_0$ and lateral positioning device $P_1$) will be parallel to the chord $d_i$ between the compasses $C_{i1}$ and $C_{i2}$ in that segment of cable (i.e., chord $d_1$ between $C_{11}$ and $C_{12}$). For example, each magnetic compass $C_{ij}$ may be located a distance from the proximal lateral positioning device $P_i$ or $P_{i-1}$ equal to one quarter of the arc length $S_i$ between each positioning device $P_i$ and $P_{i-1}$. The other pertinent terms and relationships of FIG. 3 are defined as follows:

$c_o$ = course made good heading of the vessel $P_0$ with respect to magnetic north, $c_{ij}$ = cable headings with respect to magnetic north for each compass $C_{ij}$, $d_i$ = chord subtending the arc of curvature of the cable between adjacent compass pairs $C_{i1}$ and $C_{i2}$ (e.g., i.e. $d_1$ between $C_{11}$ and $C_{12}$), $D_i$ = chord subtending the arc of curvature of the cable between the vessel and/or the adjacent lateral positioning devices ($P_{i-1}$ and $P_i$) located at the ends of each arc i, i=1,3 (i.e. $D_1$–$D_3$), $s_i$ = cable length between adjacent compass pairs $C_{i1}$ and $C_{i2}$ in each arc i, i=1–3, (i.e. $s_1$–$s_3$), $S_i$ = cable length between points $P_{i-1}$ and $P_i$ (vessel $P_0$ and devices $P_1$, $P_2$, and $P_3$), (i.e. $S_1$–$S_3$), $a_i$ = angle between the parallel chords $d_i$ and $D_i$ and the tangent line for the cable heading $c_{i1}$, (i.e. $a_1$–$a_3$)

$b_i$ = angle between a line pointing in the direction of the vessel's course made good heading $C_0$ and the chords $d_i$ and $D_i$ (i.e. $b_1$–$b_3$).

Each chord $D_i$ defined in the above manner becomes a directed line segment with vector components $X_i$ and $Y_i$. Computation of each coordinate pair $X_i$, $Y_i$ and the distance $R_i$ and bearing $\theta_i$ from the vessel ($P_0$) to each lateral positioning device $P_i$ is as follows (assuming equal spacing of compass pairs $C_{i1}$ and $C_{i2}$ from adjoining points $P_{i-1}$ and $P_i$, respectively):

$$a_i = \tfrac{1}{2}(c_{i1} - c_{i2})$$

$$b_i = a_i + c_0 - c_{i1}$$

$$d_i = (180 \cdot s_i / \pi \cdot a_i) \cdot \sin a_i$$

$$D_i = (180 \cdot s_i / \pi \cdot a_i) \cdot \sin (a_i \cdot S_i / s_i)$$

$$X_i = D_i \cos b_i;\ Y_i = D_i \sin b_i$$

$$R_i = \sqrt{[(\Sigma_i X_i)^2 + (\Sigma_i Y_i)^2]}$$

$$\theta_i = 180° - \tan^{-1}(\Sigma_i Y_i / \Sigma_i X_i)$$

Examination of the signs of the $\Sigma_i X_i$ and $\Sigma_i Y_i$ give the bearing $\theta_i$ with respect to the selected (course made good) heading $c_0$ as shown in a truth table depicted in FIG. 4.

A typical plot of locations with respect to the course made good heading of the vessel for the three lateral positioning devices of FIG. 1 is illustrated in FIG. 5. Such plot is based on a matrix of display cells wherein the entire cell in which a determined X-Y coordinate falls is brightened on the face of the cathode ray tube display 21. This four point plot of X-Y coordinates is updated prior to each firing cycle (approximately every 12 seconds) or, if seismic data is not being gathered, as often as is initiated by the computer 30. If desired, greater positional definition of the cable can be provided by computing and displaying the X-Y coordinates of other points along the cable such as the locations of the cable mounted magnetic compasses 12A.

In addition to the location of the marine vessel and the lateral positioning devices, the locations of various obstacles that lie of the path of the vessel or its cable, such as other vessels, drilling towers, etc., may also be displayed with their X-Y coordinates. It is envisioned that the range and heading of the obstacle is determined by suitable means such as the vessel's radar or sonar. The cable control operator enters the obstacle's range and heading into the computer 30 by means of the input keyboard of the recorder/printer 32. Suitable programming in the computer responds to the information entry, and generates a signal representing the X-Y coordinates of the obstacle which is entered in the matrix of the display. A corresponding cell, such as that indicated by the * is illuminated. Updated range and heading information can be periodically entered by the operator through the recorder/printer 32. Updated X-Y coordinates of the obstacle are generated by the computer which enters the coordinates into the matrix of the cathode-ray tube device 21. It is envisioned that suitable radar and/or sonar equipment may be provided for automatic periodic entry of the obstacle range and bearing information into the computer 30 for display update.

The cable control operator selectively controls one or more lateral positioning devices 14 to bring the cable into line along the selected track or to otherwise steer the cable in a desired manner by entering a lateral positioning device command into the computer 30 by a suitable computer interface means such as the keyboard of the printer/recorder 32. The operator command identifies the particular lateral positioning device to be controlled, and the direction and magnitude of the desired movement of its plurality of vertical, adjustable control surfaces. For example, a command "P1+010" might be used to indicate a rotation of ten degrees ("010") in a plus ("+") direction (clockwise or counterclockwise, however defined) in the first lateral positioning device ("P1") along the cable. In response to the operator command the computer 30 generates a coded digital word identifying the selected positioning device and the necessary actuation of motor means in the selected lateral positioning device to accomplish the commanded adjustment. The information contained in the coded digital word regarding motor actuation will vary depending upon the method and apparatus selected for use in the lateral positioning devices to control their operation. For example, in the preferred embodiment of a lateral positioning device described herein, a DC stepper motor is provided in each lateral positioning device for the rotation of a pair of vertical fins 44 (see FIGS. 2, 6 and 7). The computer 30 is provided with tables converting degrees of fin rotation to stepper motor pulses. The coded digital word would therefore contain the direction of current supplied to the motor (so as to control its direction of rotation) and the numbers of pulses required to accomplish the operator selected rotation.

It is further preferred that computer 30 be capable of generating, in response to an operator command, a unique digital word commanding a selected lateral positioning device to return its adjustable control surfaces to a neutral position. Again, in the embodiment of the system being described, each lateral positioning device is provided with rotatable, vertically oriented control surfaces or fins 44 (see FIGS. 6 and 7). The neutral position of the fins 44 is an essentially zero angle of attack with respect to the central longitudinal axis of the lateral positioning device running essentially parallel to the central longitudinal axis of the cable 12. It is envisioned, for example, that the computer generated digital control word be provided with a bit that indicates either return of the fins to the neutral position or some other specified rotation, the specifics of which are contained in other bits of word. The coded digital word is passed through an output channel of the computer 30 to the transmission means 34. The transmission means 34 comprises a buffer 34A, a signal generator 34B and an amplifier 34C. The buffer 34A contains registers or other suitable means for storing in sequence each coded digital command word outputted by the computer 30. A signal from the interrogator 23 indicates when interrogation of the various compasses is completed so that transmission of the coded digital words to the lateral positioning devices can commence. Signals between the vessel and magnetic sensors 12 and between the vessel and lateral positioning devices 14 must be transmitted through the seismic cable 12 at separate times and during breaks between the seismic data recording cycles to prevent crosstalk and other signal interference. Upon receiving the appropriate signal from the interrogator 23 indicating the end of the cable sensor polling operation, circuitry in the buffer 34A passes the digital control words from the registers of the buffer 34A in sequence to the signal generator 34B which converts the digital control words into an encoded signal which is passed through amplifier means 34C and onto wires 35 passing through the length of the cable 11.

The control components of each lateral positioning device 14 are depicted representatively, in block diagram forms, in FIG. 2 and consist of receiver means 36, decoder means 38, actuator means 40, motor means 42 such as a reversible DC stepper motor, and adjustable control surfaces 44. Each receiver means 36 in each lateral positioning device 14 senses the digital control words being transmitted through the wires 35 by means of an induction coil 36A or other similar device. Suitable circuitry 36B within the receiver means 36 amplifies the detected signal, reconstructs the original digital control word and passes it to a suitable storage means such as a register 38A in the decoder means 38. Other registers (not depicted) are provided together with suitable circuitry so that additional digital control words detected from the cable can be stored for sequential processing.

The digital control word in the register 38A is examined by appropriate circuitry 38B of the decoder means to determine if the word is directed to that particular lateral positioning device. If the word is directed to that device the circuitry 38B within the decoder determines if the fins are to be returned to the neutral position or if some other rotation is desired, and generates appropriate signals which are carried to the actuator means 40. In response to the decoder generated signals, the actuator means 40 supplies current in the appropriate direction and for the necessary time to the motor means 42 to accomplish the commanded control surface adjustment. Each lateral positioning device 14 is also provided with a power supply 46 such as dry cell batteries for operation of the motor means 42 and other electrical components. Suitable mechanical linkages 43 transfer kinetic energy from the motor means 42 to the control surfaces 44 for adjustment as commanded by the operator.

Figures 6, 8:
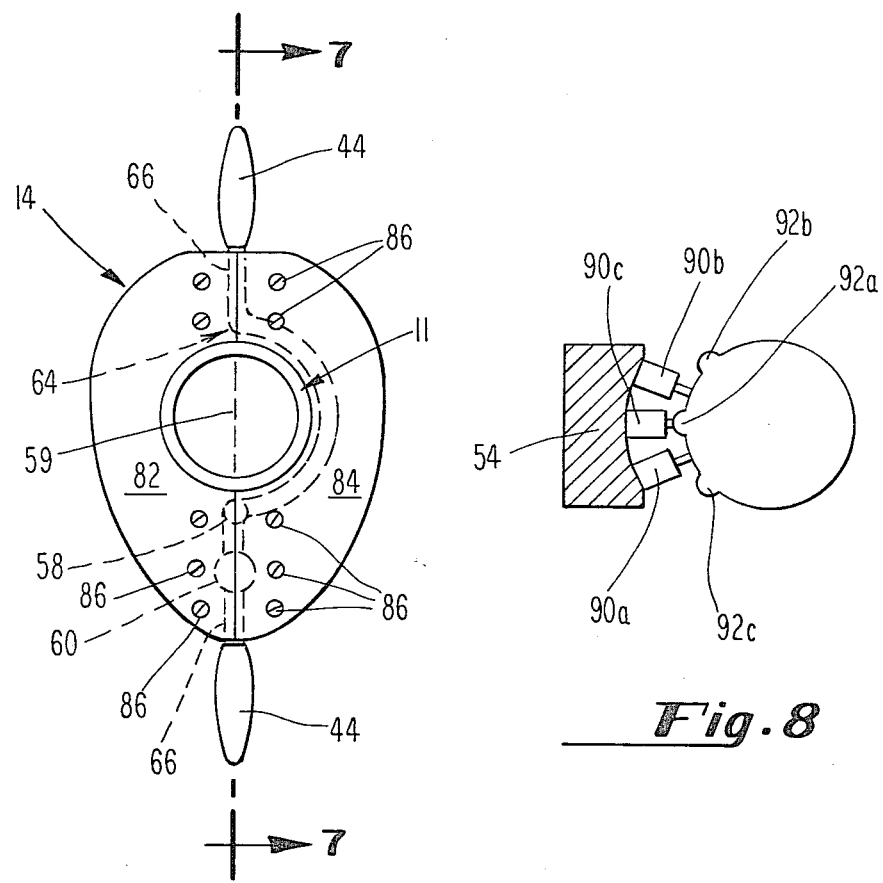
FIG. 6 is a front view of a lateral positioning device mounted to a cable.
FIG. 8 is a section view of the device of FIG. 7 as viewed along the section line 8—8.
Figure 7:
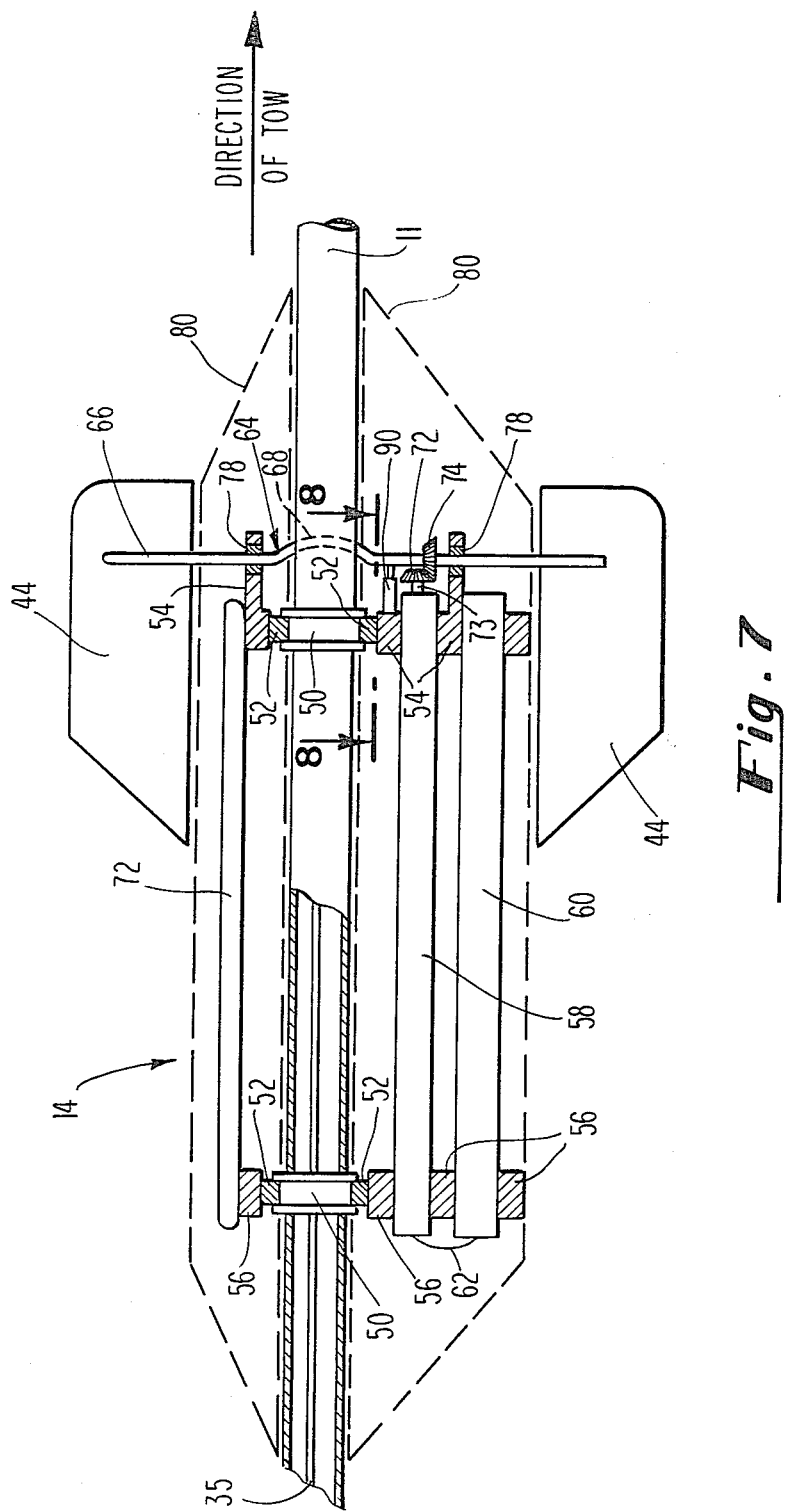
FIG. 7 is a section view of the lateral positioning device of FIG. 6 as viewed along the section line 7—7.

FIGS. 6 and 7 are a front and a sectioned diagrammatic side profile view, respectively, of a lateral positioning device 14 for use with the invention. Split collars 50 are fixedly attached to the seismic cable 11 where it is desired to mount the lateral positioning device 14. Each collar contains a channel which accepts a concentric ring 52. Each ring 52 is split for mounting around the collar and is locked by appropriate means after mounting. Once locked, each ring is free to rotate within the channel of its collar 50. Mounting bracket means 54 and 56 are fixedly secured by suitable means to each ring 52. Each mounting bracket means 54 and 56 accepts a first tube 58 and second tube 60. The mounting bracket means 54 and 56 secure each tube 58 and 60 along a diametric axis 59 of the cable 11. The first tube 58 contains the receiver means, decoder means, actuator means and motor means. The second tube 60 contains a plurality of dry cell batteries which provide power through appropriate wiring 62 to the motor means and electrical components of the first tube 58. The mounting bracket means 54 is also suitably formed to accept a pair of diametrically opposed colinear shafts 66 of a yoke 64 having a curved central section 68 to allow the passage of the cable 11. Fixedly attached to each shaft 66 is a vertically oriented control surface or fin 44. As only vertically oriented fins 44 are provided, the device 14 can only be used for controlling the location of the cable 11 in the horizontal plane. Each ring 52 allows a free rotation of each bracket means 54 and 56 with mounted tubes 58 and 60 and yoke 64 as the cable 11 twists. The weight of the tubes 58 and 60 will maintain the lateral positioning device 14 in the proper vertical orientatiion. If desired, buoyancy means 72 can be provided to assist in maintaining the lateral positioning device 14 in the vertical orientation and also to provide neutral buoyancy.

The yoke 64 and connected fins 44 are rotated by motor means within the tube 58. A first beveled gear 72 is attached to a shaft 73 from a reversible DC stepper motor within the first tube 58. A suitable bearing and sealing member (not depicted) is provided in the end of the tube 58 for passage and rotation of the shaft 73 while preventing the entry of water. A second beveled gear 74 is fixedly secured to a shaft 66 of the yoke 64. As can be seen, operation of the motor will cause the gears 72 and 74 to rotate along with the yoke 64 to which the gear 74 is fixedly secured. The mounting bracket means 54 are also provided with suitable bearing members 78 for rotatable mounting of the yoke 64. If desired, a streamlined fairing 80 (depicted in phantom) made of fiberglass or other suitable material, can be provided to further streamline the lateral positioning device 14. It is envisioned that the fairing 80 can be provided in two halves 82 and 84 which are fixedly secured to one another and around the cable 11 by suitable means such as screws 86. The tubes 58 and 60 provide protection for their contained components so it is unnecessary to seal the fairing 80, if provided. Induction means 36A (FIG. 2) are located in the first tube 58 and sense the encoded control signals transmitted along the wires 35 by the transmission means 34.

Means are also provided for generating signals to reposition the control surfaces 44 in a neutral orientation essentially parallel to the central longitudinal axis of the lateral positioning device 14 whereby lateral thrust is not generated. For example, three waterproofed microswitches 90a, 90b and 90c are fixedly secured to the mounting means 54 and are activated by cam surfaces 92 on the lower shaft 66 of the yoke 64. FIG. 8 depicts diagrammatically and in enlarged scale, the microswitches 90a, 90b and 90c affixed to the mounting means 54 and cam surfaces 92a, 92b and 92c on the lower shaft 66 of the yoke 64. It is envisioned that each lateral positioning device 14 is originally deployed with its control sur faces 44 in the neutral position. In that position, the microswitch 90a is closed by the cam surface 92a and generates a signal which is carried back to the actuator means 40. As the shaft 66 is rotated in response to a coded command word, in either the clockwise or counterclockwise direction from the neutral position (as viewed in FIG. 8), the cam surface 92a strikes either the microswitch 90b or 90c, respectively, which switch also generates an appropriate signal carried back to the actuator means 40. The signal from the microswitch 90b or 90c indicates the state of rotation (clockwise or counterclockwise) of the shaft 66 from the neutral orientation and is used to set a switch, register or other comparable device within the actuator means 40 so as to indicate that state of rotation. When the operator commands the return of the adjustable control surfaces 44 to the neutral position, the decoder means generates an appropriate signal which is passed to the actuator means 40. In response to the aforesaid decoder signal, circuitry within the actuator means 40 examines the state of rotation of the shaft and provides electric current in the appropriate direction to the stepper motor 42 to rotate the shaft 66 back to the neutral position. As the cam surface 92a again passes the microswitch 90b or 90c the switch again generates a signal which is used to reset the switch, register or other device within the actuator means 40 used to indicate the state of rotation of the shaft 66. Circuitry within the actuator means 40 also responds to the signal generated by the switch 90a when contacted by the cam surface 92a and terminates the provision of electric power to the motor 42.

Other cam surfaces 92b and 92c are provided as rotation stops. The cam surface 92b or 92c will contact the switch 90b or 90c, respectively, when the limit of rotation of the shaft 66 is reached. Appropriate circuitry in the actuator means 40 responds to the signal from the aforesaid switch 90b or 90c and to the state of the switches, registers or the like indicating the state of rotation of the shaft 66 to stop the supply of current to the motor 42 before it or the mechanical linkages are damaged or the cable subject to excessive drag forces.

Other lateral positioning device embodiments and variations are disclosed and described in the aforesaid U.S. Pat. Nos. 3,605,674 to Weese and 4,033,278 to Waters which, together with the aforesaid U.S. Pat. No. 3,953,827 to Le Moal et al. and U.S. patent application Ser. No. 885,916 by Walter P. Neeley are incorporated by reference herein. It will of course be appreciated by one in the art that suitable modifications such as the provision of decoder means must be provided in each such lateral positioning device for it to function with the described system embodiment. It will further be appreciated that each device may be provided with adjustable horizontal control surfaces for depth control and/or with compound movement surfaces, as are disclosed in the aforesaid U.S. Pat. No. 4,033,278, which may be controlled themselves in a manner similar to that described above.

It should also be realized that the adjustments of said lateral positioning devices to position the cable in a straight line along a heading from the towing vessel can be accomplished automatically by a suitably sized and programmed computer.

Various modifications may be made to the foregoing described lateral positioning method and system description without departing from the spirit and scope of the present invention as set forth in the appended claims. For example, in lieu of the use of magnetic compasses in the cable sensors 12, there may be employed other sensors such as encoding gyros or strain gauges. Further, various types of recording and display equipment may be employed on the vessel for indicating cable location and various types of operator stations may be employed for outputting and inputting control signals, obstacle heading and the like. Moreover, other types of motors and/or mechanical linkages may be provided in the lateral positioning devices for adjustment of the control surfaces.

I claim:

1. A system for controlling the lateral position of a marine cable being towed by a vessel and having adjustable control surfaces affixed to said marine cable at a plurality of spaced-apart positions along said cable for varying lateral thrust to said cable in response to control signals from the vessel, the improvement comprising:

(a) a motor associated with each control surface for rotating said control surface from a neutral position at which no lateral thrust is imparted to said cable to a second position at which a desired lateral thrust is imparted to said cable, (b) receiving means associated with each control surface for decoding the control signals from said vessel and producing a first electric current of magnitude and direction necessary to cause said motor to rotate said control surface of said second position, (c) means associated with each control surface for automatically returning said control surface to said neutral position after the desired lateral thrust has been imparted to said cable by said control surface, said means comprising:

(i) a plurality of switches fixed in circular orientation, (ii) a cam mounted within the circular orientation of said switches for rotational movement with control surface, the rotational movement of said cam sequentially activating said switches to provide an orientation signal representative of the direction and magnitude of the rotation of the control surface, and (iii) means for converting said orientation signal to a second electric current of magnitude and direction necessary to cause said motor to rotate said control surface back to said neutral position.

* * * * *